H. L. IDE.
ANIMAL OPERATED LIQUID DISTRIBUTER.
APPLICATION FILED JAN. 11, 1915.
1,191,791.
Patented July 18, 1916.
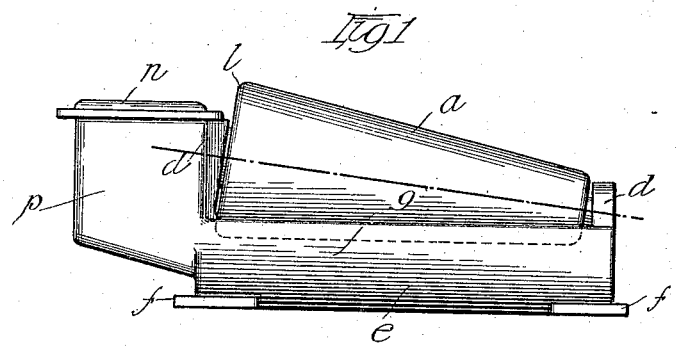
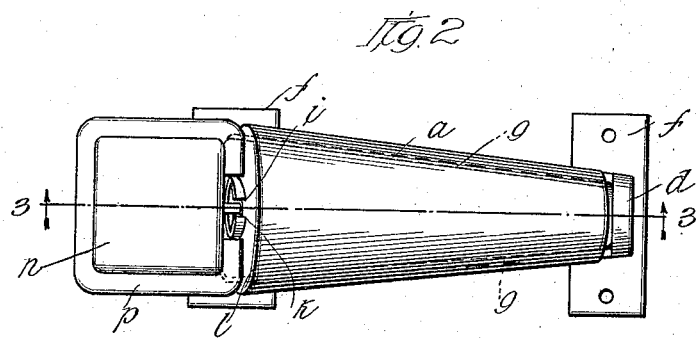
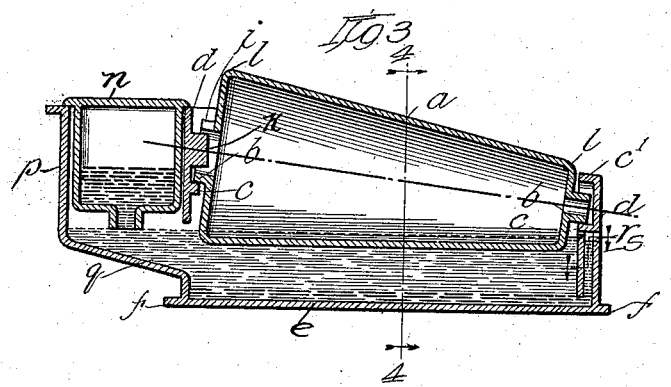
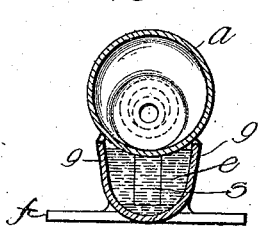
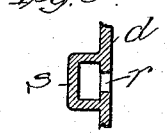
Witnesses
Inventor:
Harry L. Ide,
By G. H. Bragg
Atty

UNITED STATES PATENT OFFICE.

HARRY L. IDE, OF SPRINGFIELD, ILLINOIS.

ANIMAL-OPERATED LIQUID-DISTRIBUTER.

1,191,791.  Specification of Letters Patent.  Patented July 18, 1916.

Application filed January 11, 1915.  Serial No. 1,518.

*To all whom it may concern:*

Be it known that I, HARRY L. IDE, citizen of the United States, residing at Springfield, in the county of Sangamon and State of Illinois, have invented a certain new and useful Improvement in Animal-Operated Liquid-Distributers, of which the following is a full, clear, concise, and exact description, reference being had to the accompanying drawings, forming a part of this specification.

My invention relates to devices which may be operated by animals, such as hogs, to cause such devices to apply suitable oil or other liquid to the skin of the animals to rid them of vermin and otherwise contribute to their comfort.

My invention has for one of its objects the provision of a device of this class which may be operated to advantage by big and little hogs, and in accomplishing this object of my invention I employ an elongated distributing roller in the form of a truncated cone and whose axis is preferably so inclined as to bring the portion of the roller which is lowermost substantially horizontal to enable the roller throughout its length to transfer oil from an oil holding trough over the bottom of which the roller is mounted. By this arrangement of the tapered roller, its smaller end is also brought more fully within reach of the smaller hogs.

I will explain my invention more fully by reference to the accompanying drawing in which—

Figure 1 is a side view of the structure; Fig. 2 is a plan view; Fig. 3 is a vertical section on line 3 3 of Fig. 2; Fig. 4 is a section on line 4 4 of Fig. 3; and Fig. 5 is a section on line 5 5 of Fig. 3.

Like parts are indicated by similar characters of reference throughout the different figures.

The roller $a$ is provided with trunnion projections $b$ at its ends, these projections being at the axis of the roller. The trunnions $b$ are supported by the bottom parts of the insetting pockets $c$ which are formed in the upper extensions of the end walls $d$ of a trough $e$. The trough is provided with suitable feet $f$ to permit attachment of the device to a suitable foundation structure. The longitudinal side walls $g$ of the trough $e$ are disposed below the axis of the roller $a$ (shown by a dot and dash line), the sides of the roller well overhanging the underlying trough.

I prefer to make one end of the roller larger than the other end. For example, a roller twenty inches long preferably has its larger end ten inches in diameter and its smaller end five inches in diameter. I so incline the axis of this roller toward the lower and smaller end that the bottommost portion of its conical surface is horizontal there to be parallel with the upper surface of the oil to enable all parts of the roller to have oil evenly applied thereto. The hogs, big and little, rub against the lower half of the roller thereby readily to effect its rotation, the smaller hogs especially seeking the smaller and lower end where they work the oil in and around their ears and neighboring parts and climb upon the roller to oil the lower parts of their bodies. Means are provided for preventing the hogs from materially lifting the roller out of the trough as they rapidly revolve the roller. To this end one of the trunnions is desirably made hollow, a slot $i$ (extending longitudinally of the roller) extending through this trunnion to permit of the passage of an insetting vertically elongated or upright lug $k$ (cast upon the trough structure and extending a short distance into the pockets $c$) when the roller is to be mounted within its bearings. The slot $i$ is but a trifle wider than the width of the upright lug $k$ so that in all positions of the roller, excepting that which the roller is caused to assume for the purpose of its assembly or removal, the slot $i$ cannot be passed over the lug $k$ whereby the roller cannot well be dislodged at this end as it is being rapidly turned. In placing the roller in position its right hand trunnion $b$ is inserted beneath the cover $c^1$ and within the right hand pocket having this cover whereafter the roller is turned until the opening $i$ in the left hand trunnion $b$ is placed underneath and is brought into register with the lug $k$ over which the opening $i$ is passed as the roller is lowered. This cover $c^1$ prevents the hogs from scraping dirt into the pocket having it. Any water that may have been caught in the trough cannot, in freezing, burst the machine by the upward pressure which the freezing water would exert upon the roller, the trunnion being allowed sufficient freedom to permit the roller to rise. The ends of the conical roller are rounded at *l*, the entire roller thus being of a formation which will enable it, as it is being turned, to transfer oil or other liquid to various portions of the body of the hog, the rounded end of the rollers being particularly adapted to transfer the oil to the ear and shoulder portions of the animal.

Enough oil or other liquid may be placed directly in the trough, sufficiently to fill it. A reservoir for an additional quantity of such oil or other liquid for replenishing the oil in the trough is preferably provided. This reservoir desirably consists of a removable inverted bottle *n*. The discharge neck *o* of the bottle terminates at the level of the oil in the trough when the bottle *n* is in position. As the oil is removed from the trough the oil in the trough is correspondingly replenished by oil from the bottle *n* which flows out of the bottle until the level of oil in the trough reaches and seals the bottle neck. The container *p* for the bottle is desirably cast integrally with the trough, the interior of the container having communication at *q* with the trough below the normal level of the oil in the trough, the passage at *q* also extending below this oil level, the whole arrangement being such that the oil may readily flow between the bottom of the bottle container and the trough.

These hog oilers are generally placed in open fields or yards and the troughs thereof will, therefore, receive rain water. In order to prevent the water from so raising the level of lighter oil as to cause its overflow from the trough I provide an automatically operating water discharge outlet passage which is shown as including an upper opening *r*, whose bottom is adjacent the normal level of the oil, and a vertical channel portion defined by a rectangular tubular portion *s* which is open at both ends to afford communication between the opening *r* and the trough. The upright tube *s* is desirably integrally formed with the right hand end of the trough. By means of said tube and opening *r* at its upper end, the level of the oil is not only prevented from rising above a predetermined height but is substantially maintained, assuming sufficient incoming rain water to be received below the oil to replace the volume of spent oil. It is desirable to provide an initial quantity of water in the trough, sufficient immediately to start the overflow of water when further water in admitted to the trough during the presence of oil in the bottle.

While I have herein shown and particularly described the preferred embodiment of my invention I do not wish to be limited to the precise details of construction shown as changes may readily be made without departing from the spirit of my invention, but

Having thus described my invention I claim as new and desire to secure by Letters Patent the following:—

1. A device for enabling an animal to apply liquid to its skin including a trough for holding the liquid; a tapering distributing roller overhanging a longitudinal side of the trough to enable it to be turned by the animal to transfer liquid from the trough space to the animal, the axis of the roller being so inclined as to bring the bottom of the roller substantially horizontal.

2. A device for enabling an animal to apply liquid to its skin including a trough for holding the liquid; a tapering animal operated distributing roller mounted over the bottom of the trough to transfer liquid from the trough to the animal, the axis of the roller being so inclined as to bring the bottom of the roller substantially horizontal.

3. A device for enabling an animal to apply liquid to its skin including a trough for holding the liquid; a tapering animal operated distributing roller mounted over the bottom of the trough to transfer liquid from the trough to the animal, the axis of the roller being inclined downwardly toward the small end of the roller.

4. A device for enabling an animal to apply liquid to its skin including a trough for holding the liquid; a tapering animal operated distributing roller mounted over the bottom of the trough and overhanging a side thereof to transfer liquid from the trough to the animal, the axis of the roller being inclined downwardly toward the small end of the roller.

5. A hog oiler comprising a medicament container, upstanding bearing standards carried at opposed ends of the container, a frusto-conical distributing roller journaled in the bearing standards, one of said standards being higher than the other, the smaller end of the distributing roller being disposed adjacent to the smaller of the standards, said distributing roller being disposed above the standards.

In witness whereof, I hereunto subscribe my name this fifth day of January A. D., 1915.

HARRY L. IDE.

Witnesses:
ETTA L. WHITE,
G. L. CRAGG.

Copies of this patent may be obtained for five cents each, by addressing the "Commissioner of Patents, Washington, D. C."